United States Patent Office 3,703,498
Patented Nov. 21, 1972

3,703,498
POLYURETHANE MILLABLE GUMS BASED ON POLYESTERS HAVING UNSATURATION IN BOTH THE ACID AND ALCOHOL PORTIONS
Thomas G. Harris, Lancaster, Pa., assignor to Armstrong Cork Company, Lancaster, Pa.
No Drawing. Continuation-in-part of application Ser. No. 99,709, Dec. 18, 1970. This application Aug. 16, 1971, Ser. No. 172,328
Int. Cl. C08g 17/10, 22/10
U.S. Cl. 260—75 NK                                    12 Claims

ABSTRACT OF THE DISCLOSURE

Unsaturated polyester resins prepared by reacting tetrahydrophthalic anhydride or endic anhydride; optionally, an aromatic dicarboxylic acid or its equivalent; a diol having an allyl unsaturated group pendant from the diol chain; a polyoxyalkylene diol; and, optionally, an alkylene diol. The resins are chain-extended with diisocyanate to provide a polyurethane millable gum which may be cured by either a peroxide or sulfur cure to give elastomers of improved physical properties.

CROSS-REFERENCE TO RELATED APPLICATIONS

This application is a continuation-in-part application of my copending application Ser. No. 99,709, filed Dec. 18, 1970 now abandoned. Related applications are Magnusson U.S. application Ser. No. 810,786, filed Mar. 26, 1969, entitled "Sulfur-Curable Polyester Resins" and Magnusson U.S. application Ser. No. 810,788, filed Mar. 26, 1969, entitled "Sulfur and Peroxide-Curable Polyester Resins," both now abandoned.

BACKGROUND OF THE INVENTION

Field of the invention

This invention relates to an unsaturated polyester resin which has unsaturation contributed by portions of both the acid and alcohol reactants forming the resin and which is further derived from the reaction product of an aromatic dicarboxylic acid or its equivalent and a polyoxyalkylene diol. It more particularly relates to the unsaturated chain-extended polyester millable gum formed by reacting this polyester resin with a diisocyanate. The millable gum may be compounded and processed on conventional elastomer processing equipment and cured by either a peroxide or sulfur cure to produce rubbery articles having enhanced physical properties.

Description of the prior art

It is recognized that a polyurethane millable gum, to receive wide acceptance, should respond readily to either a peroxide or sulfur cure, should not exhibit reversion tendencies at cure temperatures, and should be ozone resistant. Furthermore, the cured products should exhibit a suitable balance of properties such as elongation, compression set, heat stability, water resistance, oil, fuel and solvent resistance, and low temperature flexibility.

It is also known to prepare hard, highly cross-linked polyurethane plastics suitable for use as a substitute for hard rubber and steel and, where the prepolymer is formed from some components containing ethylenic unsaturation, it is known that vulcanization with sulfur or peroxide is advantageous although it is claimed such ethylenic unsaturation is not necessary (Muehlhausen et al. U.S. Pat. No. 3,230,199). Also polyester resins have been described which cure to give useful, flexible and even elastomeric polymers and, according to Gianatasio writing in Rubber Age, July 1969, the most successful polyurethane millable gums used today in the United States are prepared from unsaturated glycols.

Magnusson U.S. patent application Ser. No. 810,786 is directed to sulfur-curable polyester resins based on an aromatic dicarboxylic acid, tetrahydrophthalic anhydride, a polyether diol and, optionally, an alkylene glycol. These polyester resins may be chain-extended with diisocyanate to produce millable gums which are readily sulfur cured to yield useful elastomeric compositions. Magnusson U.S. patent application Ser. No. 810,788 discloses sulfur and peroxide-curable polyester resins which are based on an aromatic dicarboxylic acid, a polyether diol and, optionally, an alkylene glycol, and an allyl unsaturated glycol component such as trimethylolpropane mono allyl ether or glyceryl mono allyl ether.

The resins containing the unsaturation provided by the tetrahydrophthalic anhydride reactant, when chain-extended with toluene diisocyanate, provide millable gums that cure redaily with sulfur but only slightly with peroxide. The sulfur-cured materials, although generally exhibiting good physical properties, display poor compression set values at elevated temperatures. Those resins based on phthalic anhydride and polyether diols-alkylene glycols containing unsaturation provided by either trimethylolpropane mono allyl ether or glyceryl mono allyl ether yield materials that cure readily with both peroxide and sulfur after they have been chain-extended with toluene diisocyanate. When the compositions were adjusted to avoid reversion, it became apparent that, as improved low temperature flexibility was sought, the amount of unsaturation also had to be increased. A limit was reached where the composition became brittle at roughly minus 30° C., and attempts at further improvement reintroduced reversion. Minor improvements in low temperature flexibility can be obtained by replacing the polyoxyethylene diol with one of higher molecular weight or by replacing the polyoxyethylene diol with one of the polyoxypropylene diol types, but major improvement would only be expected by an increase in the content of the flexibilizing portion of the polyester provided by the polyoxyethylene diol reactant. This, in such compositions, could not be accomplished without reintroducing reversion.

SUMMARY OF THE INVENTION

I have found that sulfur and peroxide-curable millable gums which have good low temperature properties and which are not susceptible to reversion can be formed by chain-extending polyesters having unsaturation in both the acid and alcohol portions of the reaction product. These polyesters are based on the reaction product of an aromatic dicarboxylic acid, anhydride or ester, and a polyoxyalkylene glycol. The unsaturation is provided in the acid portion of the reaction product by incorporating tetrahydrophthalic anhydride or endic anhydride (norbornane 2,3-dicarboxylic anhydride) as one of the polyester reactants and in the alcohol portion of the reaction product by incorporating a diol having an allyl unsaturated group pendant from the diol chain as one of the polyester forming reactants. If desired, the tetrahydrophthalic anhydride or endic anhydride may be utilized as the sole acid reactant in the unsaturated polyester resins of this invention. Gumstocks are prepared from these dual unsaturated polyester resins by reacting them with 0.8 to 1.0 equivalents of diisocyanate.

DESCRIPTION OF THE PREFERRED EMBODIMENT

The dual unsaturated polyester resins which are the subject of this invention are obtained by condensation of the acids or anhydrides with diols to obtain a base polyester having an average molecular weight, as obtained by end group analysis, of about 2,500 or more.

The base polyester resins are then chain-extended by reaction with between about 0.8 and 1.0 equivalents of an organic diisocyanate. Chain-extension may be accomplished by almost any diisocyanate such as 2,4-toluene-diisocyanate, diphenyl methane 4,4'-diisocyanate, dicyclohexyl methane 4,4'-diisocyanate and/or prepolymers obtained by reacting about two mols of such diisocyanate with one mol of a diol.

Polyester resins which are to be chain-extended should be mostly hydroxy terminated (i.e., should have acid numbers of about 5 or less and preferably 1 or less). The method of Erhart and Rohrer, U.S. Pat. No. 3,457,236, is helpful in preparing such polyester resins. In this method, a 10 to about a 30 mol percent excess of glycol is used at the beginning of the reaction. The excess glycol should be comparatively volatile (ethylene glycol and propylene glycol being preferred) in order to facilitate removal by distillation during the ester interchange stage of the reaction.

The unsaturated polyester resins of this invention are the condensation products of an aromatic dicarboxylic acid, anhydride, or ester, a member selected from the group consisting of tetrahydrophthalic anhydride, endic anhydride and mixtures thereof, a diol having an allyl unsaturated group pendant from the diol chain, a polyoxyalkylene glycol, and an alkylene diol.

The aromatic dicarboxylic acids, their anhydrides and esters, may be represented by the following formulas:

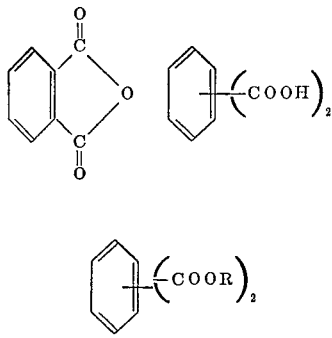

In the formulas, R is an alkyl radical of 1 to 3 carbon atoms. Examples of aromatic dicarboxylic acids or their anhydrides which are particularly useful in forming the unsaturated polyester resins of this invention are terephthalic acid and phthalic anhydride. This reactant is preferably present in the polyester to the extent of from 0 to 30 mol percent.

In addition, 20 to 50 mol percent of a member selected from the group consisting of tetrahydrophthalic anhydride, endic anhydride and mixtures thereof is utilized in the preparation of the polyester to form the unsaturated group in the acid portion.

The diols having allyl unsaturated groups pendant from the diol chain which are useful in forming the polyester resins of this invention are utilized to the extent of about 1 to 10 mol percent in the reactants forming the polyesters and are preferably of the general formula:

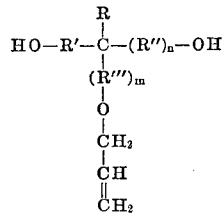

In the formula, the hydroxyl groups may be primary or secondary; R may be H or an alkyl group of from 1 to 5 carbon atoms; R', R", R''' are alkylene groups of from 1 to 5 carbon atoms; $m$ is equal to 0 or 1 and $n$ is equal to 0 or 1. Examples of alkyl unsaturated diols useful in the practice of the invention are trimethylolpropane monoallylether and glyceryl monoallylether.

In addition, a member selected from the group consisting of a polyoxyalkylene diol having an average molecular weight in the range of about 400 to 4,000 and mixtures thereof are utilized in forming polyester resins. The mol percent range for the polyoxyalkylene diol reactant may vary from 20 to 40 when the diol has an average molecular weight of about 400 and with the range varying proportionately at higher average molecular weights based on an equal weight substitution of the higher average molecular weight diol for the 400 molecular weight diol. Thus, where the diol had an average molecular weight of 4,000, the range would be 2 to 4 mol percent.

The diol reactants constitute about 50 mol percent of the reactants forming the polyester and, where the combined total of the diols having an allyl unsaturated group pendant from the diol chain and the polyoxyalkylene glycol members constitute less than 50 mol percent, the balance necessary to give 50 mol percent of diol reactants in the reaction product is made up from an alkylene diol of the formula HO—R—OH wherein R stands for an alkylene radical of 2 to 6 carbon atoms.

The following procedure was used in the preparation of the polyester resins listed in Table I. Table I-A sets forth the initial charge in mols.

The polyester forming reactants were initially charged to a kettle equipped with a stirrer, gas purge and a packed condenser. The reactants were heated, and volatiles, mostly water, were removed until the acid number became about 2 or below. The reaction was carried out by gradually increasing the temperature from about 190° C. to 220° C. under a gas purge of carbon dioxide at 3.5 cubic feet per minute. The gas purge was disconnected and the packed condenser was replaced by an unpacked-type condenser. Ethylene glycol was removed under reduced pressure until the desired hydroxyl number was reached, at a temperature of about 220° C.

The following preparation was used for forming the millable gums listed in Table II.

The polyester formed in accordance with the above outlined procedure was transferred to a closed jacketed mixer and reacted with substantially an equivalent of diisocyanate at a temperature of between about 250° F. and 275° F. until free isocyanate was no longer detectable. The millable gums were then compounded on a two roll mill using the following recipes:

|  | For peroxide cure | For sulfur cure |
|---|---|---|
| Millable gum | 100.0 | 100.0 |
| SRF Black | 20.0 | 20.0 |
| MT Black | 40.0 | 40.0 |
| Cure system | 1.6 | 9.0 |

The cure systems utilized for the examples were as follows:

|  | For peroxide cure | For sulfur cure |
|---|---|---|
| Cadmium stearate |  | 0.5 |
| Sulfur |  | 1.5 |
| 2,2'-benzothiazyl disulfide |  | 4.0 |
| 2-mercapto benzothiazole |  | 2.0 |
| Zinc chloride-2,2' benzothiazyl disulfide complex |  | 1.0 |
| Dicumyl peroxide (40%) | 4.0 |  |

The cures themselves were carried out at 315° F. in a closed press with the time of cure as shown in Table III.

Table IV sets forth the physical properties of the cured compounded gumstock. A softening with increased aging at 300° F. is taken as displaying reversion, no changes or hardening is a sign that reversion is absent.

3,703,498

TABLE I.—POLYESTER COMPOSITIONAL AND PREPARATORY DATA

| | Example | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Initial charge (percent by wt.): | | | | | | | | | | | | | | | | | | |
| Phthalic anhydride | 40.41 | 40.41 | 33.82 | 33.82 | 13.46 | 13.46 | 6.86 | 6.86 | 5.94 | 5.94 | 20.64 | 20.64 | 35.15 | 34.97 | 30.31 | 35.15 | 34.97 | 30.31 |
| Tetrahydrophthalic anhydride | | | | | 20.73 | 20.73 | 28.17 | 28.17 | 24.40 | 24.40 | 14.14 | 14.14 | 0.80 | 1.60 | 1.39 | 0.80 | 1.60 | 1.39 |
| Trimethylol propane mono allyl ether | 5.70 | 5.70 | 3.97 | 3.97 | 3.96 | 3.96 | 0.81 | 0.81 | 0.70 | 0.70 | 0.81 | 0.81 | 54.84 | 54.55 | 63.05 | 54.84 | 54.55 | 63.05 |
| Polyoxyethylene diol (400 molecular weight) | 41.01 | 41.01 | 54.23 | 54.23 | 53.92 | 53.92 | 54.93 | 54.93 | 63.43 | 63.43 | 55.15 | 55.15 | 9.03 | 8.70 | 5.07 | 9.03 | 8.70 | 5.07 |
| Ethylene glycol | 12.70 | 12.70 | 7.79 | 7.79 | 7.75 | 7.75 | 9.05 | 9.05 | 5.35 | 5.35 | 9.08 | 9.08 | 0.18 | 0.18 | 0.18 | 0.18 | 0.18 | 0.18 |
| Stannous octoate | 0.18 | 0.18 | 0.19 | 0.19 | 0.18 | 0.18 | 0.18 | 0.18 | 0.18 | 0.18 | 0.18 | 0.18 | 0.92 | 0.72 | 1.00 | 0.92 | 0.72 | 1.00 |
| Condensation: Final acid number | 1.6 | 1.6 | 3.4 | 3.4 | 1.5 | 1.0 | 0.7 | 0.7 | 1.8 | 1.8 | 1.3 | 1.3 | | | | | | |
| Ester interchange: | | | | | | | | | | | | | | | | | | |
| Final acid number | 0.48 | 0.51 | 0.43 | 0.43 | 0.42 | 0.36 | 0.25 | 0.25 | 0.27 | 0.27 | 0.39 | 0.39 | 0.33 | 0.25 | 0.29 | 0.33 | 0.25 | 0.29 |
| Final hydroxyl number | 23.82 | 22.78 | 22.97 | 22.97 | 25.77 | 30.06 | 27.30 | 27.30 | 32.23 | 32.23 | 24.11 | 24.11 | 22.66 | 26.01 | 29.39 | 22.66 | 26.01 | 29.39 |

TABLE I-A

| | Example | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Initial charge (mol relationship): | | | | | | | | | | | | | | | | | | |
| Phthalic anhydride | 50.0 | 50.0 | 50.0 | 50.0 | 20.0 | 20.0 | 10.0 | 10.0 | 10.0 | 10.0 | 30.0 | 30.0 | 50.0 | 50.0 | 50.0 | 50.0 | 50.0 | 50.0 |
| Tetrahydrophthalic anhydride | | | | | 30.0 | 30.0 | 40.0 | 40.0 | 40.0 | 40.0 | 20.0 | 20.0 | 1.0 | 2.0 | 2.0 | 1.0 | 2.0 | 2.0 |
| Trimethylol propane mono allyl ether | 6.0 | 6.0 | 5.0 | 5.0 | 5.0 | 5.0 | 1.0 | 1.0 | 1.0 | 1.0 | 1.0 | 1.0 | 30.0 | 30.0 | 40.0 | 30.0 | 30.0 | 40.0 |
| Polyoxyethylene diol (400 molecular weight) | 19.0 | 19.0 | 30.0 | 30.0 | 30.0 | 30.0 | 30.0 | 30.0 | 40.0 | 40.0 | 30.0 | 30.0 | 31.5 | 30.5 | 20.5 | 31.5 | 30.5 | 20.5 |
| Ethylene glycol | 37.5 | 37.5 | 27.5 | 27.5 | 27.5 | 27.5 | 31.5 | 31.5 | 21.5 | 21.5 | 31.5 | 31.5 | | | | | | |

TABLE II.—GUMSTOCK

| | Example | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Composition (percent by wt.): | | | | | | | | | | | | | | | | | | |
| Polyester | 96.35 | 96.49 | 96.48 | 96.48 | 96.09 | 95.49 | 95.90 | 95.90 | 92.30 | 92.30 | 94.59 | 94.59 | 96.54 | 96.07 | 95.58 | 96.54 | 96.07 | 95.58 |
| Toluene diisocyanate | 3.62 | 3.48 | 3.49 | 3.49 | 3.895 | 4.51 | 4.10 | 4.10 | | | | | 3.46 | 3.93 | 4.42 | 3.46 | 3.93 | 4.42 |
| Diphenylmethane 4,4'-diisocyanate | | | | | | | | | 7.70 | 7.70 | | | | | | | | |
| Dicyclohexylmethane 4,4'-diisocyanate | | | | | | | | | | | 5.41 | 5.41 | | | | | | |
| Tertiary butyl catechol | 0.03 | 0.03 | 0.03 | 0.03 | 0.015 | | | | | | | | | | | | | |

TABLE III.—CURE

| | Example | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Type | Peroxide | Sulfur | Peroxide | Sulfur | Peroxide | Sulfur | Peroxide | Sulfur | Peroxide | Sulfur | Peroxide | Sulfur | Peroxide | Peroxide | Peroxide | Sulfur | Sulfur | Sulfur |
| Time (mins.) | 30 | 30 | 15 | 30 | 30 | 30 | 30 | 30 | 30 | 30 | 30 | 30 | 30 | 30 | 30 | 20 | 20 | 20 |
| Temp. (° F.) | 315 | 315 | 315 | 315 | 315 | 315 | 315 | 315 | 315 | 315 | 315 | 315 | 315 | 315 | 315 | 315 | 315 | 315 | atoms, said alkylene diol being present in an amount sufficient to bring the total mol percent of the diol reactants to about 50 mol percent of the total reactants where (C) plus (D) total less than 50 mol percent of the total reactants.

2. An unsaturated polyester in accordance with claim 1 in which (C) is a diol of the formula

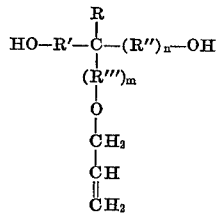

wherein the hydroxyl groups are primary or secondary and wherein R equals hydrogen or an alkyl group containing 1 to 5 carbon atoms; R', R'', and R''' are alkylene groups of 1 to 5 carbon atoms; $m$ is equal to 0 or 1 and $n$ is equal to 0 or 1.

3. An unsaturated polyester in accordance with claim 1 wherein (C) is trimethylol propane monoallylether and (D) is a polyoxyethylene diol having a number average molecular weight of about 400.

4. An unsaturated polyester resin having a minimum number average molecular weight of about 2,500 comprising the condensation product of
  (A) about 0 to 30 mol percent of phthalic anhydride
  (B) about 20 to 50 mol percent of tetrahydrophthalic anhydride (A) plus (B) totalling 50 mol percent
  (C) about 1 to 10 mol percent of trimethylol propane monoallylether
  (D) about 20 to 40 mol percent by weight of a polyoxyethylene diol having a number average molecular weight of about 400, and
  (E) sufficient ethylene glycol to bring the total mol percent of diol reactants to about 50 mol percent where (C) plus (D) total less than 50 mol percent.

5. A millable gum prepared by chain-extending the polyester of claim 1 with about 0.8 to 1.0 equivalents of an organic diisocyanate.

6. A millable gum prepared by chain-extending the polyester of claim 2 with about 0.8 to 1.0 equivalents of an organic diisocyanate.

7. A millable gum prepared by chain-extending the polyester of claim 3 with about 0.8 to 1.0 equivalents of an organic diisocyanate.

8. A millable gum prepared by chain-extending the polyester of claim 4 with about 0.8 to 1.0 equivalents of an organic diisocyanate.

9. A millable gum prepared in accordance with claim 5 wherein the organic diisocyanate is selected from toluene diisocyanate, diphenyl methane 4,4'-diisocyanate, dicyclohexyl methane 4,4'-diisocyanate and mixtures thereof.

10. A millable gum prepared in accordance with claim 6 wherein the organic diisocyanate is selected from toluene diisocyanate, diphenyl methane 4,4'-diisocyanate, dicyclohexyl methane 4,4'-diisocyanate and mixtures thereof.

11. A millable gum prepared in accordance with claim 7 wherein the organic diisocyanate is selected from toluene diisocyanate, diphenyl methane 4,4'-diisocyanate, dicyclohexyl methane 4,4'-diisocyanate and mixtures thereof.

12. A millable gum prepared in accordance with claim 8 wherein the organic diisocyanate is selected from toluene diisocyanate, diphenyl methane 4,4'-diisocyanate, dicyclohexyl methane 4,4'-diisocyanate and mixtures thereof.

References Cited
UNITED STATES PATENTS

| | | | |
|---|---|---|---|
| 2,905,652 | 9/1959 | Best et al. | 260—45.4 |
| 3,043,807 | 7/1962 | Snyder et al. | 260—75 |
| 3,100,759 | 8/1963 | Boussu et al. | 260—77.5 |
| 3,554,951 | 1/1971 | Blomeyer | 260—29.1 |
| 3,230,199 | 1/1966 | Muehlhausen et al. | 260—75 |
| 3,457,236 | 7/1969 | Ehrhart et al. | |

DONALD E. CZAJA, Primary Examiner

H. S. COCKERAM, Assistant Examiner

U.S. Cl. X.R.

260—75 UA

United States Patent Office 3,703,499
Patented Nov. 21, 1972

3,703,499
FUSIBLE THERMOSETTING POWDER RESIN AND PRODUCTION THEREOF
Martin K. Lindemann, 102 Independence Drive, Greenville, S.C. 29607
No Drawing. Filed Jan. 28, 1971, Ser. No. 110,768
Int. Cl. C08g 22/20
U.S. Cl. 260—77.5 AT          13 Claims

ABSTRACT OF THE DISCLOSURE

Thermoplastic resin powder containing active hydrogen is mulled with a stoichiometric deficiency of liquid alkoxy monoisocyanate. This consumes the active hydrogen atoms at the surface of the powder, generating alkoxy groups at the surface surrounding a core containing unreacted active hydrogen atoms. When the powder is fused, the active hydrogen atoms remaining in the core mix with the alkoxy groups generated at the surface to induce a rapid thermosetting action after significant fusion has been completed.

---

The present invention relates to fusible resins possessing thermosetting characteristics and which are in powder form.

Powder resins are particularly useful for molding and coating with the powder particles fusing together under the influence of elevated temperature, either with or without the assistance of pressure. Most of these powder resins have been thermoplastic, but this limits the utility of the product since the thermoplastic materials are heat and solvent sensitive and the physical properties are frequently inadequate. On the other hand, the thermoplastic resins flow and fuse easily and are frequently quite attractive and available with economic advantage.

The main objective of this invention is to provide a simple and effective means of transforming certain types of thermoplastic resin powders into thermosetting resin powders and to provide thermosetting resin powders which maintain their capacity to fuse and flow.

It will be appreciated that it is difficult to prepare thermosetting resins in powder form because, when the powder is dried, some of the thermosetting action occurs, advancing the resinification of the materials and reducing the capacity of the powder particles to fuse and flow. Moreover, and even when the resin is placed in powder form, the elevated temperature required to fuse the resin particles also provokes the thermosetting action, and if the cure is a vigorous one, the thermosetting action proceeds before fusion is complete. This hampers film formation in powder coating, and it reduces the capacity of a material being molded to flow and fill the mold.

In this invention, the thermoplastic powder containing active hydrogen poorly reactive with itself is mulled with a liquid alkoxy monoisocyanate in stoichiometric deficiency so that the active hydrogen atoms at the surface of the powder particles is consumed and alkoxy groups generated in their place. This provides powder particles having a thermoplastic core containing unreacted active hydrogen atoms, but essentially free of alkoxy groups, and a surface portion containing alkoxy groups which are only slowly reactive with one another, but essentially free of active hydrogen atoms. When the particles fuse with one another at elevated temperature, the core and the surface portions of the particles intermix, causing the alkoxy groups to mingle with the active hydrogen atoms at elevated temperature where they react rapidly to thermoset the system. In this way the thermosetting resin powders are easily and efficiently formed and they possess superior fusion and flow properties since the rapid thermosetting action is forced to wait until significant fusion has been completed.

The alkoxy monoisocyanates contemplated by this invention are illustrated by alkoxy alkyl monoisocyanates which are liquid at about room temperature, but normally solid materials are less desirably employed using organic solvent to liquify the isocyanate compound to permit the desired mulling operation to take place. These are preferably illustrated by methoxy methyl isocyanate which has the formula $CH_3-O-CH_2-NCO$ which is a liquid boiling in the range of 80–90° C. More broadly, isocyanates having the formula $R-O-R'-NCO$ are contemplated, these being formed by the reaction of monohalo ethers with sodium cyanate. The R and R' groups are alkyl groups which may contain from 1–4 carbon atoms, but which are preferably methyl. The production of methoxy methyl isocyanate and the reaction with sodium cyanate is illustrated as follows:

A suspension of 700 grams sodium cyanate in a solvent mixture of 500 cc. benzonitrile and 1000 cc. mesitylene is prepared. To this mixture 648 grams of chloromethylmethyl ether is added. This mixture is refluxed until all organic chlorine has been converted to inorganic chlorine (about 12 hours). The formed methoxy methyl isocyanate is fractionally distilled directly from the mixture. The yield is 585 grams methoxy methyl isocyanate or 84% of theory. Boiling point at 760 mm. 89–90° C.

The thermoplastic powder resin may be of diverse type so long as it includes active hydrogen atoms reactable at relatively low temperature with the isocyanate group. This class of hydrogen atoms is well known, but the hydroxy group is particularly contemplated since it is strongly reactive with the alkoxy group at elevated temperature. Similarly, amino hydrogen and even amido hydrogen are reactive with isocyanate at low temperature and are reactive with alkoxy at elevated temperature. Carboxyl groups are also useful as is the mercaptan group. However, the invention particularly prefers hydroxy groups and primary amido hydrogen atoms, either alone or in admixture with one another. Carboxyl groups are preferably also present in small amount (from 0.1–5%, preferably from 0.2–1.0% by weight) to provide a catalytic effect for the elevated temperature cure involving the residual hydroxy groups.

Other functional groups may also be present such as epoxy groups or tertiary amino groups to aid the final cure or to improve adhesion in coating use. However, epoxy groups reduce the stability of the thermosetting powder, an effect which should be kept in mind when such groups are present.

Addition copolymers of monoethylenic monomers are particularly contemplated, such as copolymers of vinyl chloride and vinyl acetate which have been hydrolyzed to provide the desired hydroxy content. The corresponding partially hydrolyzed ethylene-vinyl acetate copolymers are also quite useful. Similarly, acrylic copolymers with allyl alcohol, trimethylol propane monoallyl ether or 2-hydroxy ethyl methacrylate can be used or styrene-allyl alcohol copolymers which may be employed as such or containing 1% of copolymerized acrylic acid. Indeed, all of the thermoplastic resinous polyols may be handled in this invention, including polyethers, polyesters and epoxy esters. The ester group in the epoxy ester or in the polyester may be saturated or unsaturated and the polyester would normally include a small acid functionality in addition to the larger hydroxy functionality which is desired.

The thermoplastic resinous polyols which are preferably used in this invention will desirably include from 1–15% OH by weight, preferably from 3–10% OH by weight.

The preferred resins have an hydroxy value of at least 20, preferably at least 40.